G. S. HUME.
METHOD OF SEALING CANS.
APPLICATION FILED MAR. 26, 1914.

1,141,061.

Patented May 25, 1915.

Witnesses
N. W. Primm
Edwin J. Beller

Inventor
George S. Hume,
by Wilkinson, Giesta & MacKaye
Attorneys.

UNITED STATES PATENT OFFICE.

GEORGE S. HUME, OF EASTPORT, MAINE.

METHOD OF SEALING CANS.

1,141,061. Specification of Letters Patent. Patented May 25, 1915.

Application filed March 26, 1914. Serial No. 827,508.

*To all whom it may concern:*

Be it known that I, GEORGE S. HUME, a citizen of the United States, residing at Eastport, in the county of Washington and State of Maine, have invented certain new and useful Improvements in Methods of Sealing Cans; and I do hereby declare the following to be a full, clear, and exact description of the invention, such as will enable others skilled in the art to which it appertains to make and use the same.

My invention relates to a process for rendering more effective the joint between the lid and the body of a sealed food containing metallic receptacle.

Ordinarily receptacles containing food likely to be affected by germs in the atmosphere are made of tin and have soldered thereon lids. Sometimes the can and the lid are provided with flanges which in the seam forming machine are turned up so as to be infolded with each other, a sealing agent being placed between the folds. This sealing agent is usually a solder and the effectiveness of the joint depends upon the completeness with which the solder is distributed through over the contacting surfaces.

My invention relates to a method for effecting this joint completely and without any chance of failure.

Figure 1:
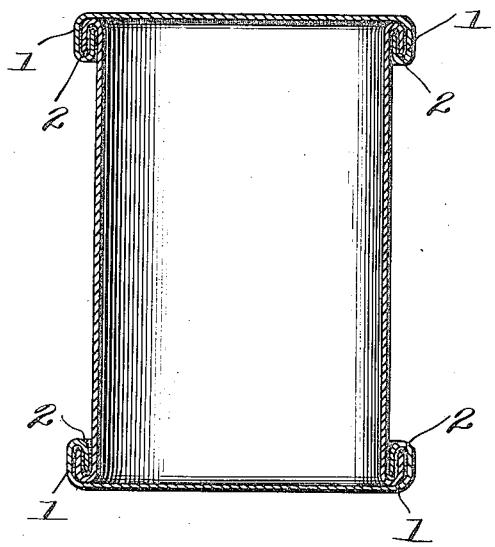
Figure 2:
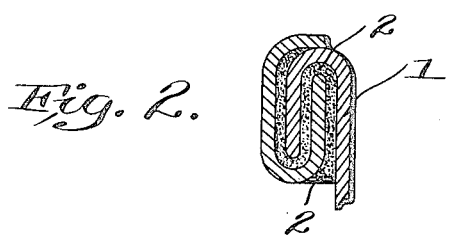

Figure 1 is the section of a can showing the application of my improved method; and Fig. 2 is an enlarged sectional view of one of the joints or seams of said can.

In carrying out my invention I take a can body of any ordinary construction, and I coat the edge where the closure is to be effected with a film of a solder composed of bismuth eight parts, tin three parts and lead five parts. This coating may be applied to the contacting surface of the lid instead of to the can, or in fact may be applied to both. The can being filled the lid is put in place and the can put through a seaming machine, whereby the seam shown at 1 is formed. Between the surfaces of the can and the surface of the lid is to be seen a layer of solder 2. This layer, unless it is fused, is not generally air-tight, and leakage of air therethrough with corresponding passage of germs and spoiling of the food is to be expected. After the can is filled and the lid rolled or seamed into place, I arrange the cans so that the lids are downward and in the steaming or boiling chamber during the process of cooking or sterilization. The bottom may be like the top or may be closed by means of a solder having a higher fusing point than that of the present. During this process of cooking the solder of course becomes fused and has some tendency to flow down into the U-shaped joint or joints between the lid and the body of the can and fill all joints. The film is too small in quantity and too thin to really run. It simply becomes liquid and distributes itself evenly over the surface with which it is in contact, spreading like oil will spread over a piece of metal, for instance. There is no danger of any of it getting into the food because in the first place, the solder being heavier than any food, will have no tendency to rise, and in the second place, where even if the solder is applied to the bottom 2, the line of contact with the food is so small, and the quantity of solder is so small, that no effect can be had there; and the film of the solder is so thin that its tendency to adhere to the metal surface overcomes any tendency of gravity.

By my invention, as carried out as above indicated, I am able to effect perfect and certain closure of the seams, and at a minimum of cost, since the use of a soldering machine or of a man with a soldering iron is obviated, it being assumed, of course, that the sealing and seaming is effected immediately after the filling of the cans.

What I claim as new and desire to secure by Letters Patent is:

The method of sealing lids upon food-containing tin cans which consists in coating the flange of an open can with a bismuth, tin and lead solder, fusible below the boiling point of water, filling said can placing the lid in position, seaming the joint between the lid and the can so that an inverted groove is formed in the can body, inverting the can so treated in water, and subjecting the can and its contents to the effect of heat by the agency of said water, heated to boiling point.

In testimony whereof, I affix my signature, in presence of two witnesses.

GEORGE S. HUME.

Witnesses:
 MARY H. CORTHELL,
 WILLIAM R. BIBBER.